Patented July 20, 1926.

1,593,345

UNITED STATES PATENT OFFICE.

ARCHIBALD YOUNG MOWREY, OF OROVILLE, CALIFORNIA.

METHOD OF MANUFACTURING SMOKING PIPES.

No Drawing.    Application filed August 17, 1925.    Serial No. 50,847.

This present invention relates to a method for manufacturing smoking pipes, and aims to provide a method of this nature wherein smoking pipes may be produced at a comparative low cost having the appearance and advantages of the well known meerschaum pipe.

The pipes are molded from a clay into the desired shape and style. Coloring matter is formed by mixing one quarter ounce of Bismarck black in one quart of alcohol. A second coloring matter is in the form of lotion carmine which is a liquid in its commercial form. The pipes after they have been molded are placed in an oven, and dried thoroughly. They are then removed from the oven, and dipped in the coloring matters mentioned above, or preferably the coloring matters are applied thereto by means of the brush, such as a camel's-hair brush, until they are a good imitation of the natural color of a meerschaum pipe colored by smoking. After the pipes have been colored, they are put back into the oven to dry.

A preparation is formed from one-half pound of beeswax in three quarts of boiled linseed oil. This composition is maintained at a boiling heat about seven or eight hours, and I then add thereto one ounce of dragon blood and stir the mixture thoroughly. This mixture will be known as mixture No. 1.

One gallon of boiled linseed oil is maintained at a boiling heat until it becomes thick and stringy like, which will require from eighteen to twenty-four hours.

The pipes are placed in mixture No. 1, while the same is boiling, and are retained therein for four or five hours, this shrinks and hardens the pipes, and prevents them from cracking. The pipes are taken out of mixture No. 1 and placed on a rack and put in an oven for four or five hours. When the pipes are dry they are taken out of the oven and dipped into the linseed oil, and then placed on a rack and put in the oven to dry. This last step gives them the desired gloss.

Having thus described my method, what I claim as new is:—

1. A method of manufacturing pipes consisting of applying coloring matter to dry clay pipes and drying said coloring matter, then placing the pipes in a mixture consisting of beeswax and boiled linseed oil maintained at a boiling point, and having added thereto dragon blood, then drying the pipes, then dipping the pipes in linseed oil which has been boiled until it has become thick and stringy like, and then drying the pipes 2. A method of treating clay pipes consisting of dipping the same into a composition consisting of beeswax boiled in boiled linseed oil, and having added thereto dragon blood, and then dipping the pipes in boiled linseed oil which has been maintained at a boiling heat until it has become thick and stringy.

In testimony whereof I affix my signature.

ARCHIBALD YOUNG MOWREY.